United States Patent [19]

Wilkinson

[11] Patent Number: 4,626,912
[45] Date of Patent: Dec. 2, 1986

[54] SEQUENTIAL DATA BLOCK ADDRESS PROCESSING CIRCUITS

[75] Inventor: James H. Wilkinson, Tadley, Near Basingstoke, United Kingdom

[73] Assignee: Sony Corporation, Tokyo, Japan

[21] Appl. No.: 488,088

[22] Filed: Apr. 25, 1983

[30] Foreign Application Priority Data

Apr. 26, 1982 [GB] United Kingdom ............... 8211975

[51] Int. Cl.$^4$ .................. H04N 5/14; H04N 7/04
[52] U.S. Cl. ................................ 358/141; 358/339; 358/160
[58] Field of Search ............ 358/342, 141, 314, 336, 358/160, 335, 339; 371/71, 25; 360/49, 33.1, 39, 36.2

[56] References Cited

U.S. PATENT DOCUMENTS 4,313,134 1/1982 Rustman et al. .................. 358/342
4,486,780 12/1984 Ive .................................. 358/160

Primary Examiner—Michael A. Masinick
Assistant Examiner—David E. Harvey
Attorney, Agent, or Firm—Lewis H. Eslinger; Alvin Sinderbrand

[57] ABSTRACT

A sequential data block address processing circuit for deriving address signals in dependence on incoming data representing, for example, a digital television signal and formed by sequential blocks of data each including a block address which changes cyclically from block to block and which is formed of three address words respectively representing block, line and segment numbers which change cyclically, the circuit comprising a read-only memory operative for each incoming block address to increment the block number and if this incrementing involves a carry to increment the line number and so on up to the segment number, and further operative for each incoming block address to form a predicted next block address which is formed of three address words each representing the respective block, line or segment number or incremented number as appropriate, and a comparator to compare each predicted next block address with the next incoming block address and to supply a correct address indication only if there is identity between one or more of the compared address words, and an address regenerator which is locked to the block addresses in the incoming data if, and only if, the correct address indication is supplied for two or more of the compared block addresses.

6 Claims, 3 Drawing Figures

1

SEQUENTIAL DATA BLOCK ADDRESS PROCESSING CIRCUITS

BACKGROUND OF THE INVENTION

1. Field of the Invention

This invention relates to sequential data block address processing circuits for deriving address signals in dependence on incoming data which comprises sequential blocks of data each including an address signal. The invention is particularly, but not exclusively, for deriving address signals in dependence on incoming data derived from a digital video tape recorder (VTR), and which comprises sequential blocks of data each formed by a plurality of pulse coded samples together representing a block of video information.

2. Description of the Prior Art

Recently there has been an increasing interest in the use of digital techniques for television signals. Such techniques are, for example, used in some video tape recording arrangements where an incoming television signal to be recorded is sampled, the samples are pulse code modulation coded into digital form, the digital data signals are recorded and subsequently reproduced by a VTR, the reproduced digital data signals are decoded, and the decoded signals are used to form an analog signal which is a replica of the original television signal.

For the purpose of recording it is usual to divide the digital data signals into blocks and to associate with each block synchronizing and address signals for use in identifying and decoding the digital signals after reproduction. The decoding apparatus generally includds some form of address counter which, when it has been locked to the incoming addresses, is able to free-wheel over any subsequent gaps in the incoming addresses due, for example, to drop-out or corruption of the information being read off a magnetic tape. Before the address counter is locked onto the incoming addresses it is necessary to be as sure as possible that the incoming addresses are valid; otherwise the address counter may be incorrectly locked with consequent erroneous routing of incoming blocks of data. This will cause severe degradation of the resulting television picture which will continue until the address counter re-locks onto valid incoming addresses.

SUMMARY OF THE INVENTION

One object of the present invention is to provide a sequential data block address processing circuit which overcomes these problems.

Another object of the present invention is to provide a sequential data block address processing circuit which will only lock to incoming data when predicted block addresses are identical with block addresses derived from the incoming data.

Another object of the present invention is to provide a sequential data block address processing circuit which predicts block addresses by incrementing numbers represented by incoming block addresses.

According to the present invention there is provided a sequential data block address processing circuit for deriving address signals in dependence on incoming data, the circuit comprising:

means to receive incoming sequential blocks of data each including a block address which changes cyclically from block to block and which is formed of a plurality of address words each representing a respective number which changes cyclically;

means operative for each incoming block address to increment the number represented by the address word of said block address which represents the least significant said number and if said incrementing involves a carry to increment the number represented by the address word of said block address which represents the next more significant said number, and so on up to the address word of said block which represents the most significant said number, and further operative for each incoming block address to form a predicted next block address which is formed of a plurality of address words each representing the respective said number or incremented number as appropriate; and means to compare each said predicted next block address with the next incoming block address and to supply a correct address indication only if there is identity between two or mroe of the compared block addresses.

Thus the comparator compares a predicted block address to a first block address by sequentially comparing the first address words representing present numbers to the second address words representing respective present numbers and respective incremented numbers. The comparator generates an output signal for each compared pair of address words if identity is detected between the pair. Circuits are provided that generate a correct address indication for each compared block address only if identity is detected between at least one of the compared pairs of address words. Circuits are further provided to generate the locking signal only if a correct signal indication is produced for at least two successive block address comparisons.

The above, and other objects, features and advantages of this invention will be apparent from the following detailed description of illustrative embodiments which is to be read in connection with the accompanying drawings.

DESCRIPTION OF THE PREFERRED EMBODIMENTS

The sequential data block address processing circuit to be described is for use with a digital VTR. Prior to recording on the VTR, a television signal is converted into digital form by sampling the incoming television signal periodically to provide a sequence of samples, and each sample is then pulse code modulation coded to form a data word. These data words are grouped into blocks of 128 data words. Six such blocks, that is 768 data words, represent one horizontal scan line of the television signal. In practice, each of these blocks is sub-divived into a pair of sub-blocks which are respectively supplied to the two heads of a pair or recording and reproducing heads. About fifty-five times six such blocks represent a socalled segment of one field of the television signal, and five or six such segments, depending upon whether the television signal is a 525-line system television signal such as NTSC, or a 625-line system television signal such as PAL, form a field of the television signal. It will be noted that this coding provides for more lines than the total number of active horizontal scan lines in one field of a 525 or 625-line system television signal field, the excess lines being used to provide check words, such as block parity words, for detecting and correcting errors in the reproduced data words. Moreover, if required, further provision may be made for error detection and correction and for error concealment, for example by shuffling the order of the data prior to recording and de-shuffling after reproduction.

Figure 1:
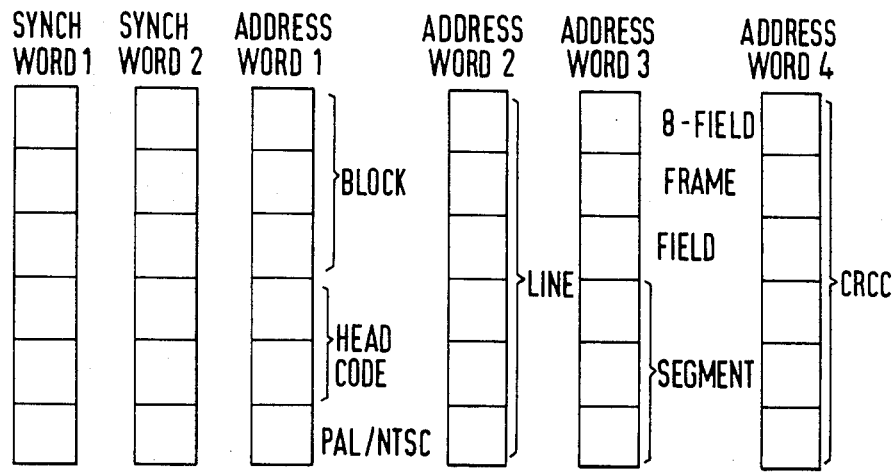
FIG. 1 indicates in outline the structure of synchronizing and address words to be associated with a data block.

Referring to FIG. 1, there is associated with each 128-word data block, two synchronizing words and first, second, third and fourth address words. As initially formed, each of the address words is a 6-bit word. The general structure is indicated in FIG. 1 and will now be described in detail:

Address Word 1

First three bits

Block number in the range 0 to 5 with the most significant bit first.

Fourth and fifth bits

Head code to enable up to four magnetic recording and reproducing heads to be distinguished.

Sixth bit

PAL/NTSC identifier, or more precisely 625-line system signal/525-line system signal identifier.

Address Word 2

All six bits

Line number in the range 0 to 54 with the most significant bit first.

Address Word 3

First bit 8-field identifier, this being "0" for fields 0,1,2 and 3.

Second bit

Frame identifier, this being "0" for fields 0,1,4 and 5

Third bit

Field identifier, this being "0" for fields 0,2,4 and 6

Fourth to sixth bits

Segment number in the range 0 to 5 for a 625-line system (PAL) and 0 to 4 for a 525-line system signal (NTSC). The most significant bit is first.

Address Word 4

All six bits

Cyclic redundancy check (CRC) code to provide for error detection and possibly correction of the bits of the address words 1 to 3 on reproduction. If an error is detected but not corrected, then an error flag in the form of a bit "1" is attached to the address word which is in error.

Further details of this address structure and the way in which it is generated will be found in our copending UK patent application No. 8124895 (Ser. No. 2 105 953). In the present description attention can, for simplicity, be largely confined to just three parts of the total structure indicated in FIG. 1, these parts being the block number, the line number and the segment number. Here it should be mentioned that if there is capacity for the line number to attain a sufficiently large value, the segment number may be replaced by a field number, but in the description which follows it will be assumed to be a segment number.

Figure 2:
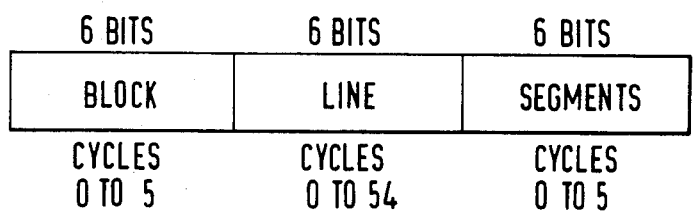
FIG. 2 shows parts of the address words in simplified form.

FIG. 2 indicates these three parts of a single block address and also indicates that in the particular example under consideration the block number cycles sequentially through the range 0 to 5, the line number cycles sequentially through the range 0 to 54, and the segment number cycles sequentially through the range 0 to 5 (assuming a 625-line system).

The reproducing portion of the VTR includes an address regenerator comprising an address counter having three component parts corresponding respectively to block number, line number and segment number. Each component part is programmed to cycle sequentially through the appropriate range of numbers and to provide, when necessary, carries to the next component part. During reproduction, the address counter is locked to the incoming addresses and the output of the address counter is used to route each incoming block of data, for example, to the appropriate address in a field store. Once locked, the address counter free-wheels over any gaps in the incoming addresses due, for example, to drop-out or corruption of the signals being read off the magnetic tape of the VTR. In view of the severe television picture degradation which will follow erroneous routing of blocks of data consequent on wrong locking of the address counter, it is necessary to be certain that the incoming addresses are valid, before the address counter is locked to them.

Hitherto this has been done by predicting from each incoming block number what the next block number should be, by adding one to the preceding block number, with due regard to the cycling from 5 back to 0. The predicted next incoming block number is then compared with the actual next incoming block number to check for equality. Additionally each line number is compared with the next incoming line number, and each segment number is compared with the next incoming segment number, but not to check for equality, but only for agreement to within one, because the next incoming line or segment number may correspond to a block of data in the next incoming line or segment.

The embodiment now to be described is particularly concerned with improving the prediction of the next incoming block address, preferably to achieve complete accuracy in the locking of the address counter.

Figure 3:
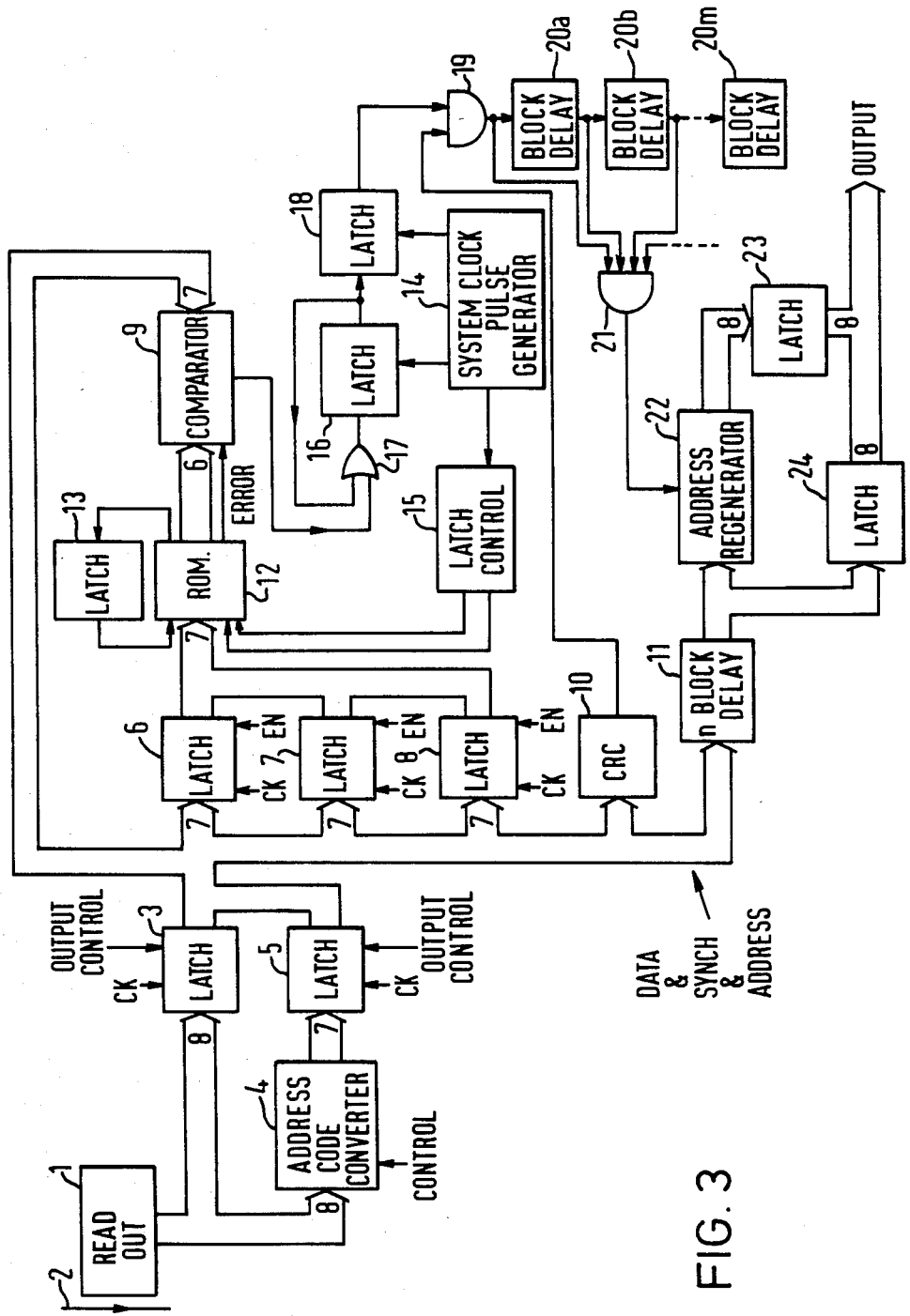
FIG. 3 shows in block form an embodiment of sequential data block address processing circuit according to the invention.

Referring to FIG. 3, the reproducing portion of a VTR includes a read out arrangement 1 for deriving digital information from a magnetic tape 2. It is assumed that the 6-bit data and address words are further encoded into 8-bit words for recording. Such encoding can reduce the direct current component to be recorded and also provides some measure of error detection on reproduction. The read out arrangement 1 supplies the reproduced 8-bit words to a latch circuit 3 and to an address code converter 4. The address code converter 4 operates under control of a control signal to decode the imcoming 8-bit address words into the corresponding 6-bit address words to each of which is then added one further bit to provide error indication. If an error has been detected this bit is made an error flag "1". The resulting 7-bit address words are supplied to a latch circuit 5. Clock and output control signals supplied to the latch circuits 3 and 5 ensure that on their output sides the 7-bit address words are time-multiplexed in the appropriate original time slots relative to the data words.

The resulting data and address words, within which each block address consists of three 7-bit words, are supplied to latch circuits 6, 7 and 8 each of which is able to store one 7-bit word, to one input of a comparator 9, to a CRC circuit 10, and to an n block delay circuit 11 which delays the signals by n block periods, where n is an integer.

The outputs of the latch circuits 6, 7 and 8 are connected in common to seven of the ten inputs of a read-only memory (ROM) 12, six of the eight outputs of which are connected to the other input of the comparator 9. The seventh output of the ROM 12 is connected back via a latch circuit 13 to another input of the ROM 12. The eighth output of the ROM 12 supplies an error signal to the comparator 9 when an error flag "1" is present in an address word. The ROM 12 is preferably a programmable ROM (PROM), and more preferably a PROM of the type which is programmable by the user, rather than of the type which is programmed at manufacture.

A system clock and control signal generator 14 supplies clock pulse signals to clock terminals of the latch circuits 6, 7 and 8. It also supplies control signals to the latch circuit 3, to the address code converter 4, to the latch circuit 5 and to a latch control circuit 15 which in turn supplies respective enabling signals to enable terminals of the latch circuits 6, 7 and 8, and in synchronism with these enabling signals a word address to the final two input terminals of the ROM 12. This word address, which simply cycles 1, 2, 3, 1, . . . indicates which of the latch circuits 6, 7 or 8 is currently enabled to supply the signals to the ROM 12.

The output of the comparator 9 is supplied to a 3-bit accumulator formed by a latch circuit 16 and a two-input OR gate 17. An output of the latch circuit 16 is fed back to one input of the OR gate 17, and other input of which is connected to the comparator 9. The output of the OR gate 17 is connected to the input of the latch circuit 16. The output of the latch circuit 16 is supplied to the input of a latch circuit 18, the output of which is connected to one input of a two-input AND gate 19. The system clock and control signal generator 14 supplies respective clock pulse signals to clock terminals of the latch circuits 16 and 18.

The output of the CRC circuit 10 is connected to the other input of the AND gate 19, the output of which is connected to the input end of a plurality of series-connected block delay circuits 20a, 20b, . . . 20m, each of which delays the signals supplied thereto by one block period. The output of the AND gate 19 is also connected to one input of an m'input AND gate 21, the other inputs of which are respectively connected to the outputs of the block delay circuits 20a, 20b, . . . 20m. Alternatively the AND gate 21 may be replaced by a PROM for greater flexibility.

The output of the AND gate 21 is connected to an address regenerator 22, this being a counter arrangement and having a data input connected to the output of the n block delay circuit 11. The data output of the address regenerator 22 is connected via a latch circuit 23 to the output of the sequential data block address processing circuit. A further data path by-passes the address regenerator 22, passing from the n block delay circuit 11 via a latch circuit 24 to the output.

The operation will now be described. An incoming first block address consisting of three 6-bit words each with a seventh bit forming an error flag is supplied to the latch circuits 6, 7 and 8 where respective words are stored. After a delay substantially equal to the interval before the arrival of the incoming second block address, the latch circuit 6 is enabled so as to supply the word stored therein, which corresponds to a present block number, to the ROM 12 which at the same time is supplied with a word address indicating that the word supplied represents a block number. The ROM 12 may be considered as comprising three sectors corresponding to block, line and segment numbers. When the ROM 12 receives a word representing a present block number it first checks that it represents a valid block number, that is one in the range 0 to 5. If not, an error flag, if not already present, is added. If valid, the block number is incremented by one to an incremented number which is the next number in the sequence. If the incrementing involves a carry, that is on incrementing from 5 to 0, a signal is supplied to the latch circuit 13. The ROM 12 then supplies a 6-bit block number word comprising the incremented block number to the comparator 9 for comparison with the 6-bit block number word of the next incoming block address. The comparator 9 also compares the error signal from the ROM 12 and the error flag associated with the block number word from the latch circuit 5 with "0", and if either is "1" the comparator 9 does not supply an output. Thus, only if the two block number words are identical, there is no error flag and no error signal is supplied to the seventh input of the comparator 9, does the comparator 9 supply an output to the gate 17.

Next, the latch circuit 7 is enabled so as to supply the word stored therein, which corresponds to a line number, to the ROM 12 which at the same time is supplied with a word address indicating that the word supplied represents a line number. When the ROM 12 receives a word representing a present line number it first checks that it represents a valid line number, that is one in the range 0 to 54. If not, an error flag, if not already present is added. If valid, the line number is incremented by one to an incremented line number which is the next number in the sequence if, and only if, there is a carry from the block number. If the incrementing of the line number involves a carry, that is on incrementing from 54 to 0, a signal is supplied to the latch circuit 13. The ROM 12 then supplies a line number word comprising the line number incremented if appropriate to the comparator 9 for comparison with the line number word of the next incoming block address. Only if they are identical, there is no error flag and no error signal is supplied to the seventh input of the comparator 9, does the comparator 9 supply an output to the gate 17.

Next the latch circuit 8 is enabled so as to supply the word stored therein, which corresponds to a present segment number, to the ROM 12 which at the same time is supplied with a word address indicating that the word supplied represents a segment number. When the ROM 12 receives a word representing a segment number, it first checks that it represents a valid segment number, that is one in the range 0 to 5. If not, an error flag, if not already present, is added. If valid, the segment number is incremented by one to an incremented segment number which is the next number in the sequence if, and only if, there are carries both from the block number and the line number. The ROM 12 then supplies a segment number word comprising the segment word incremented if appropriate to the comparator 9 for comparison with the segment number word of the next incoming block address. Only if they are identical, there is no error flag and no error signal is supplied to the seventh input of the comparator 9 does the comparator 9 supply an output to the gate 17.

It will be appreciated that the ROM 12 can operate such that if there is any error, such as an error flag, an invalid block line or segment number, or an absence of an expected carry at the end of a line or segment, it either fails to supply an output to the comparator 9 or it supplies an error signal to the seventh input of the comparator 9. Moreover, the comparator 9 operates to supply an output "0" indicating a correct comparison to the gate 17 only if the two address words supplied thereto are identical and lack error flags and error signals. Only when three successive predictions, corresponding to the block number, the line number and the segment number of a block address, are correct will the latch circuit 18, which receives a clock pulse once per block following the segment number comparison, supply an address correct signal "1" to the AND gate 19. This signal will only pass the AND gate 19 if at the same time it receives a signal "1" from the CRC circuit 10 indicating a valid CRC on the fourth address word shown in FIG. 1 and referred to above. Assuming such a valid CRC, the AND gate 19 will supply a valid address flag "1".

The valid address flag 1 could be supplied directly to the address regenerator 22 to cause the address resulting in the valid comparison, and which due to the n block delay circuit 11 is still available at the input of the address regenerator 22, to be loaded; in other words, to cause the counters in the address regenerator 22 to be re-set in agreement with that address and then to cycle on from there block by block.

However, for greater security a sequence of two or more, and preferably three, valid comparisons is required. This operation is effected by the block delay circuits and the AND gate 21, m being equal to two if three valid comparisons are to initiate loading. In this way, the possibility of erroneous routing of incoming data due to erroneous locking of the address regenerator 22 is almost completely eliminated.

The signals supplied to the output then consist of the data and synchronizing signals supplied by way of the latch circuit 24 and, appropriately time-multiplexed therewith, the address signals produced by the address regenerator 22 and supplied via the latch circuit 23.

Although the above description assumes certain numbers of data words, blocks, lines and segments, it will be realised that the invention is also applicable to other numbers and to pluralities other than three of address words in each block address. The requirement is merely that each number represented by an address word of the block address change cyclically in a predictable manner (not necessarily following the natural sequence of numbers) and that on completion of each cycle each less significant number provide a carry to the next most significant number. Moreover, the data need not represent a digital television signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A sequential data block address processing circuit for deriving address signals in dependence on incoming data, said circuit comprising;

means for generating said address signals;

means for receiving incoming sequential blocks of said incoming data, each of said blocks including a first block address which changes cyclically from block to block and which is defined by a plurality of ordered first address words, each of said first address words representing a respective present number which also changes cyclically, said present numbers being ordered in correspondence with the order of the respective first address words from a least significant present number to a most significant present number;

means for selectively incrementing each of said present numbers to form respective incremented numbers by incrementing said least significant present number and, if said incrementing causes said least significant present number to complete its cycle, effecting a carry to the next more significant present number, and similarly effecting a carry to each next more significant present number if the respective next less significant present number incremented by the carry completes its cycle and further for generating a predicted block address which is defined by a plurality of second address words ordered in correspondence with said first address words and representing said respective present number if said respective present number was not incremented and said respective incremented number otherwise; and means for comparing each predicted block address with a next incoming first block address, by comparing the number represented by each second address word of the former with the present number represented by the correspondingly ordered first address word of the latter, to define pairs of compared address words and for producing a correct address indication only if there is identity between compared address words of at least one of said pairs, and means for producing a locking signal which is supplied to said means for generating said address signals for controlling the operation thereof.

2. A circuit according to claim 1, wherein said means for generating said address signals includes address counter means supplied with said incoming data for generating second block address which change cyclically from block to block, said means for producing a locking signal supplying said locking signal to said address counter means and locking said generation of said second block addresses to said first block addresses in said incoming data.

3. A circuit according to claim 1 wherein said incoming data represents a digital television signal.

4. A circuit according to claim 3 wherein said plurality of first address words is three and said present numbers represented by said first address words correspond respectively to fractional blocks, each of which represents a fractional part of a horizontal line of said television signal, to horizontal lines of said television signal, and to segments, each of which represents a fractional part or the whole of a field of said television signal.

5. A circuit according to claim 1 wherein said means for incrementing is a read-only memory.

6. A circuit according to claim 1 wherein said means for producing a locking signal produces said locking signal only if said correct address indication is produced for compared block addresses of three successive pairs.

* * * * *